INVENTOR
BRUCE BURNS.
ATTORNEY

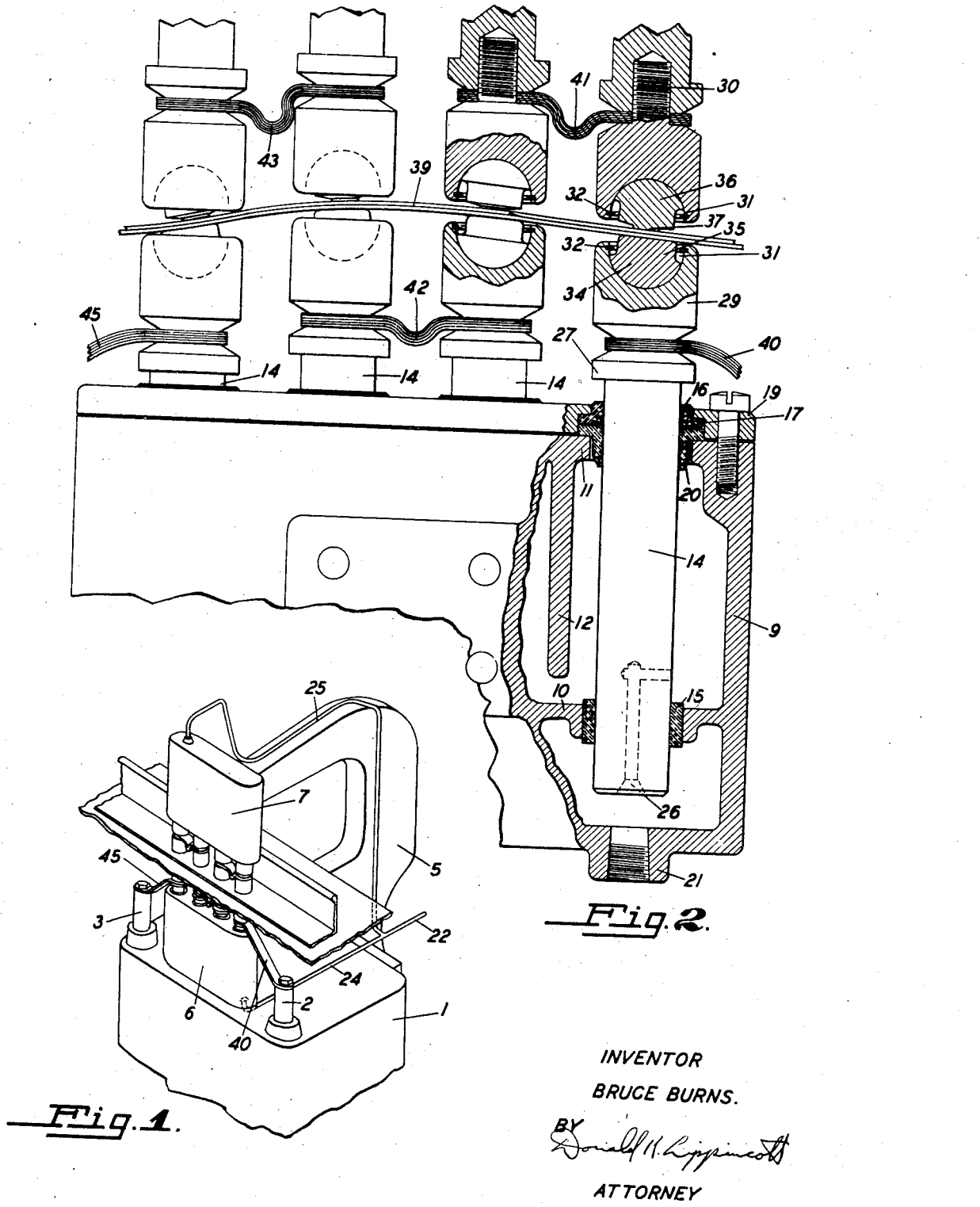
April 9, 1935.                B. BURNS                 1,996,901
                          WELDING APPARATUS
                         Filed June 12, 1933          3 Sheets-Sheet 1
INVENTOR
BRUCE BURNS.
ATTORNEY

April 9, 1935.  B. BURNS  1,996,901
WELDING APPARATUS
Filed June 12, 1933  3 Sheets-Sheet 3
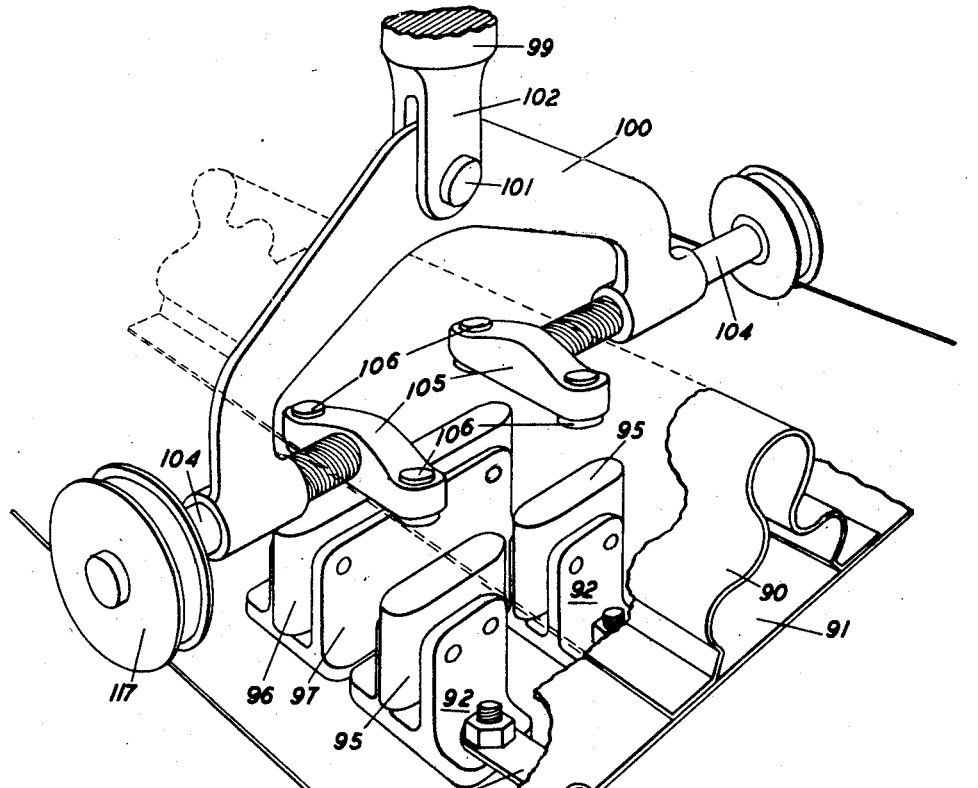
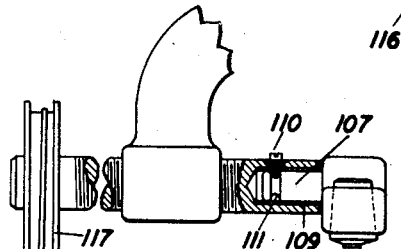
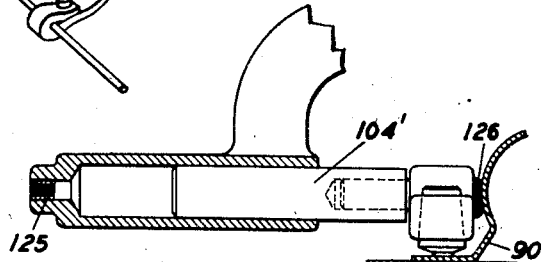
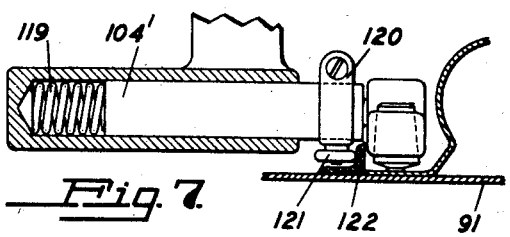
INVENTOR
BRUCE BURNS.
ATTORNEY Patented Apr. 9, 1935

1,996,901

UNITED STATES PATENT OFFICE 1,996,901

WELDING APPARATUS

Bruce Burns, Santa Monica, Calif., assignor to The Northrop Corporation, Inglewood, Calif., a corporation of California Application June 12, 1933, Serial No. 675,396

12 Claims. (Cl. 219—4)

My invention relates to welding machines, and particularly to machines for welding materials of high thermal and electrical conductivity and small cross sections, such as the aluminum and aluminum alloy parts of metal airplanes.

The spot welding process is, in many ways, peculiarly suited to aircraft construction. Not only is there a saving in weight, due to the absence of rivet heads, but there is also the gain involved in the elimination of the skin friction or drag due to those rivet heads, and an increase in security in the elimination of danger of the "working" of the rivets.

Until recently, however, the spot welding of the light aluminum and alloy sheets which are used in such craft has appeared to be impractical. The high thermal and electrical conductivity of the sheets has required that the welding current be supplied at very high densities and for extremely short periods of time, and the thinness of the section utilized, in connection with the aforementioned factor, has required extremely accurate regulation of both time and current factors if satisfactory welds are to be made. The result has been that a number of the problems inherent in all spot welding operations have become so important as to take on a wholly new aspect, and the broad purpose of this invention has been to provide a method and apparatus for spot welding which offers a solution to certain of the more harassing of these problems.

Thus the current densities used, which are of the order of three million amperes per square inch, require that the low tension leads be kept short, and one of the objects of this invention is to provide a machine wherein the lengths of secondary leads is reduced to a minimum. Another aspect of this same problem is the difficulty of supplying current at high intensities to both sides of sheets of large area, and a corresponding object of this invention is to provide a welding machine wherein the current leads are brought to one side only of the work to be welded. Another difficulty or disadvantage inherent in the high current density factor of the problem is that the connected load on the supply system is extremely large in comparison with the actual energy used, and another of the objects of this invention is the reduction of the charge thus imposed against the work by forming a plurality of welds at the same time without adding materially to the connected load.

Considered from the aspect of the frailty of the structures used in aircraft construction, one of the difficulties involves the tendency of reinforcing bars to twist or warp in response to the unequal heating and cooling involved in making the weld, and yet another object of this invention is to prevent such warping by forming simultaneous welds symmetrically with respect to the reinforcing member. Furthermore, since thin sheets of frail material of varying contour must be welded without distortion, other objects of this invention are to provide a machine wherein a plurality of welding electrodes may freely assume the contour of the work to be welded, and wherein, upon the assumption of such position by the electrodes, the necessary pressure may be applied thereto without deforming the structure.

Other objects of my invention will be apparent or will be specifically pointed out in the description forming a part of this specification, but I do not limit myself to the embodiment of my invention herein described, as various forms may be adopted within the scope of the claims.

Broadly considered, the method of my invention comprises making a pair of contacts with one surface of the work to be welded, providing a current path of lower resistance than that of the work itself and in parallel therewith upon the other side of the work, applying a suitable pressure uniformly to the contacts and passing a welding current through the contacts and said path in series, so that the current threads the work repeatedly to form a plurality of welds at the same time. The apparatus of my invention comprises a plurality of opposed pairs of electrode holders, together with means for applying an equal pressure between the holders of the respective pairs and connections between the holders and the electrodes carried thereby to form a current path threading the successive electrodes in series.

Referring to the drawings:

Figure 1 is an isometric view of a machine embodying my invention, wherein the electrode holders are hydraulically operated.

Figure 2 is a detail view, partly in elevation and partly in section, of the operating mechanism of the electrodes used in the machine of Figure 1.

Figure 5 is a perspective view of an embodiment of my invention especially adapted for the welding of stiffening ribs and the like to sheets, the equipment being suitable for application in the construction of airplane wings.

Figures 6, 7 and 8 are detailed views, partly in section, of adjustable mechanism actuated by the position of the work to be welded, which are suitable for use with the machine of Figure 5.

Figure 3:
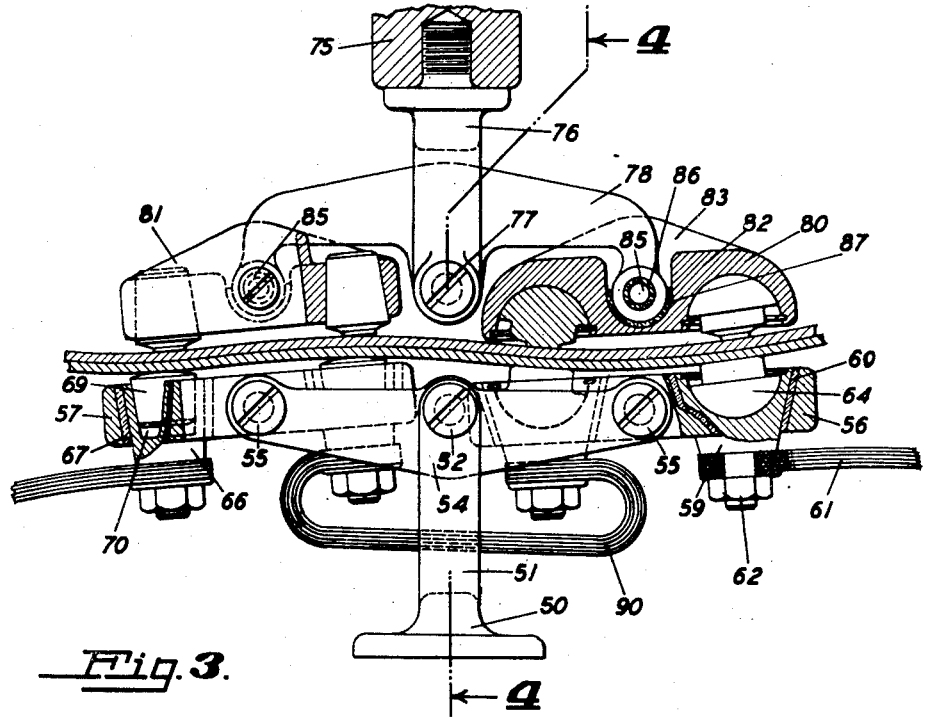
Figure 3 is an elevational view, also partly in section, of an electrode-holding device utilizing equalizing yokes for applying uniform pressure to the opposed pairs of electrodes.

In the fabrication of aircraft, particularly of the stressed skin metal type, by present day methods, an extremely large number of fastenings must be used, and these are customarily rivets. By far the greater number of these rivets are utilized to join sheet metal members of aluminum, magnesium, or the alloys of one or both of these materials. In the typical case, the thickness of these members lies between .016 and .032 inches. If spot welds are to be substituted for these rivets, a weld of 1/8 inch diameter is appropriate.

In forming a weld of this character by accepted methods, a flat faced electrode forms a contact with one side of the work, the area of this electrode being much larger than the diameter of the weld. On the opposite side of the work an electrode is used which has a body which may be of approximately the same diameter as the first electrode, with an extremely short tip of the diameter of the weld projecting from the body to form the welding contact.

The work to be welded is placed between the electrodes and a pressure of about 300 pounds, or nearly 25,000 pounds per square inch is applied. A current of say 35,000 amperes is then passed between the electrodes for a time which will vary from .01 to .10 seconds, depending upon the thickness of the sheets which are being welded.

If clean copper electrodes are used, and if the welds be accurately timed, this will yield a very satisfactory joint.

In considering this technique, certain facts will be obvious. First, the extremely high current used requires heavy conductors for supplying the electrodes and the potential drop in these conductors, both resistive and reactive, forms a large portion of the total impedance in the welding circuit. Second, the conductors must be of ample size to prevent heating, and should preferably be as short as it is possible to make them, if the power taken from the supply circuit is to be economically used. The functioning of this invention depends very largely upon these two facts.

Experiment has shown that if two electrodes are placed upon one side of a pair of sheets or other members to be welded, and a pair of electrodes are placed on the opposite side, with a satisfactorily equalized pressure applied to the two pairs of electrodes, substantially the same current supply which will make one satisfactory weld will make two in series, and the difference in the power drawn from the supply is not detectable by means of the ordinary vibrating oscillograph. Additional pairs of opposed electrodes may be added, and in actual practice four opposed pairs of welding electrodes have been used, the current passing through all of them in series, and threading and re-threading the work from one side to the other, without detectable increase in the supply power required. Furthermore, owing to the thinness of the welded sheet and to the relatively low impedance of the bridging paths as compared to these sheets, the effect of the work in short-circuiting the adjacent pairs of electrodes appears to be negligible. Experiment has further shown that should one of the welds be unsatisfactory, because of dirt between the sheets or upon the electrodes, the remaining welds are apparently unaffected, and stand up under test equally as well as singly made welds.

The instant invention is embodied in a general purpose machine shown in Figure 1. In this embodiment the welding transformer 1, having the low tension terminals 2 and 3, forms a base for the machine, upon which is mounted the heavy C-shaped frame 5. The two arms of this frame end in the upper and lower hydraulic welding heads 6 and 7, which are conveniently made substantially identical in structure, and one of which is shown in detail in Figure 2.

The head comprises a hollow reservoir 9, of substantially the shape shown in Figure 1, and having a horizontal partition 10 across the lower portion thereof. The top 11 of the reservoir is provided with heavy reinforcing ribs 12, and it is of course obvious that the entire reservoir must be made sufficiently strong to withstand the hydraulic pressure utilized to operate the machine.

Alined holes in the top 11 and the partition 10 are provided for each of the electrode holders or plungers 14, a row of four of these plungers being provided in the machine shown. The lower end of each plunger is positioned by an insulating bushing 15, which may be of hard fiber or other material capable of withstanding the mechanical stresses to which it is subjected, as well as low electrical potentials, this bushing being fitted into the hole in the partition 10, and providing a bearing for the plunger. The upper end of the plunger is alined by a bushing 16, of similar material, which is provided with a flange 17, over which is fitted a cover plate 19, the latter covering the entire upper face of the reservoir 9 and serving to retain the bushings of each of the four plungers. A rubber or leather packing washer or gasket 20 is mounted beneath the bushing 16 and is held in place thereby, serving as a seal against the pressure which operates the plungers.

Operating liquid under pressure is supplied to the head through a connecting boss 21, which is threaded to receive a suitable coupling. Referring again to Figure 1, a supply pipe 22 delivers the hydraulic operating pressure from a suitable source through branch supply pipes 24 and 25 to each of the two heads, thus insuring that under static conditions equal pressure will be applied to each of the plungers in both heads.

The lower end of each of the plungers 14 is preferably drilled to provide a by-pass 26 which forms a passage from beneath the partition 10 to the reservoir space above it, these by-passes obviating the necessity of providing additional openings through the partition 10 which would be difficult to form.

The free end of the plunger is provided with a shoulder 27, and is drilled axially and threaded to receive the heavy copper electrode 29. A threaded end 30 on the electrode screws into the body of the plunger, clamping the current supply lead or connector between the electrode itself and the plunger and forming a good electrical contact therewith. The other end of the electrode, which may be either cylindrical or prismoidal in cross section, is formed with a hemispherical recess 31 for receiving a replaceable welding contact, a groove being formed adjacent the rim of the recess for receiving a retaining ring or snap ring 32 for holding the contact in place.

The welding contacts used in the upper and lower electrodes differ slightly as to form. The contact 34, used in the lower welding head 6, is formed of copper and has the form of a segment of a sphere, of the same radius of curvature as the recess 31, from which rises a short cylindrical body 35 of somewhat smaller diameter than the sphere and having a flat upper surface. This permits the body to project through the retaining ring 32, the latter being too small in diameter to permit the passage of the larger diameter spherical segment. The upper contact 36 differs from that just described only in the fact that the surface of the cylindrical body, instead of being flat, is formed with a central tip 37, which is of the diameter of the weld, and about one-half of the diameter of the body proper. It will be seen that each contact forms with its electrode a ball-and-socket joint which enables the contact to aline itself with the surface of the work, even though this may be materially displaced from the plane perpendicular to that of the plungers. This is illustrated in the figure, where the two sheets 39, constituting the work to be welded, are shown as curved, requiring the various welding contacts to assume different angles.

The two welding heads 6 and 7 are mounted with their respective plungers in alinement, so that the eight plungers form four opposed and cooperating pairs of welding electrodes. The low tension transformer terminal 2 connects through a heavy supply lead 40 with the nearest of the lower electrodes. As the plunger is insulated, this necessitates that the current pass upward through the work to the cooperating upper electrode, which is connected to the adjacent upper electrode by the flexible connector 41. In similar manner the path may be traced down through the work to the lower electrode, through the connector 42, thence back up through the work, the connector 43, down through the work again, and back to the transformer terminal 3 through the supply lead 45. It will thus be seen that the current is passed through the work repeatedly, threading it four successive times, and forming a weld at each point where it passes through the work.

Owing to the flexibility of the supply and connecting leads 40 to 45 inclusive, the plungers 14 are freely and separately movable. When material to be welded is placed between the separated plungers, and hydraulic operating liquid supplied through the pipe 22, each of the plungers will advance, but a relatively slight force will restrain any of them, until all of the rest of them have been stopped. This, together with the self-alining feature of the welding contacts, permits the electrodes freely to assume the contour of the work. When this has been done, however, further pressure applied through the supply pipe 22 applies an equal pressure to all of the points to be welded. When the proper pressure is reached, the welding current is supplied for the predetermined length of time, and the four welds are made at once. In order that these welds be satisfactory it is merely necessary that the impedance of the paths between adjacent electrodes through the conductors 41, 42 and 43 be low in comparison to the impedance of the work, and if the cross section of these conductors be made large enough to prevent heating, in conformity with the ordinary requirements of conductors carrying currents of the magnitude of those here used, this condition will be satisfied.

Figure 4:
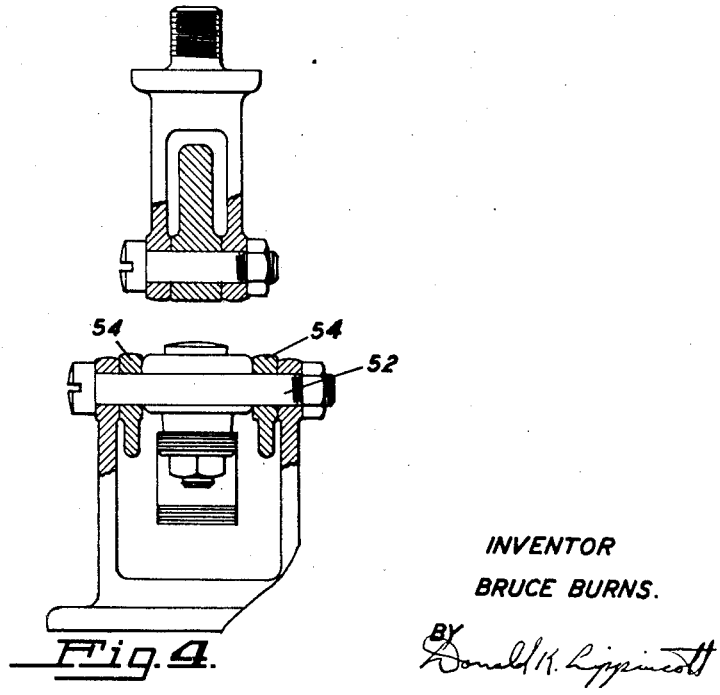
Figure 4 is a sectional view, taken on the line 4—4 of Figure 3.

An alternative form of pressure equalizing device, which is used in certain instances in place of the hydraulic heads 6 and 7, is shown in Figures 3 and 4. In this modification a pedestal 50, which may be mounted directly upon the transformer or upon any other suitable support, carries a pair of upwardly projecting arms 51, through the upper ends of which passes a horizontal bolt 52. Upon this bolt is journaled an equalizing yoke comprising a pair of yoke arms 54, these arms being symmetrical and the bolt or shaft 52 passing through the axis of symmetry. Each end of the pair of yoke arms carries a second bolt or shaft 55, which in turn supports an electrode-carrying secondary equalizing yoke 56 and 57. Each of the secondary equalizing yokes is journaled at its center, and in practice the two would usually be identical in structure, but as shown the two differ slightly in order to show the adaptation to different forms of welding electrodes without the use of a multiplicity of figures.

The yoke 56 has a conical hole formed at each end thereof, into which is fitted a conical copper electrode 59, which is insulated from the yoke by an encircling insulating bushing 60. The supply lead 61 is clamped to the end of the electrode by a stud bolt and nut 62. The upper end of the electrode is provided with a hemispherical recess which carries a welding contact 64 which is similar in all respects to the contact 34 already described.

The alternative form of equalizing yoke 57 also has conical holes formed therein equidistant from its supporting shaft 55, which carry electrodes 66 insulated by bushings 67. In this case, however, the replacable welding contacts 69 are merely plugs which are formed as frusta of cones, having slightly rounded bases, which fit into correspondingly shaped recesses 70 formed in the upper faces of the electrodes.

Opposing this lower electrode-carrying structure is a similar arrangement upon which the upper electrodes are mounted. This comprises a plunger 75, which may be either mechanically or hydraulically operated to apply the welding pressure. Into this plunger is screwed a fork 76, carrying at its lower end a bolt 77 upon which is journaled a unitary yoke 78. The electrodes 80 and 81, which are themselves formed as secondary equalizing yokes, and comprise highly conductive bodies 82, having parallel reinforcing ribs 83, are mounted on the ends of the yoke 78.

Each yoke-electrode is journaled on a bolt 85 and is insulated from the yoke 78 by an insulating bushing 86. In order better to support the pressure exerted by the yoke, an insulating half bushing 87, placed between the end of the yoke 78 and the yoke-electrode 80 or 81, serves to reinforce the journal bolt 85.

The yoke-electrode 81 is recessed on its active face to carry contacts similar to contact 36 described in connection with the hydraulically equalized device. The yoke-electrode 81 is shown as carrying conical contacts, having faces provided with slightly projecting tips, suitable for cooperating with the rounded electrode contact 69.

It will be seen that each of the electrodes on the lower yokes 56 and 57 is insulated from the adjacent electrode in the same yoke, while the contacts on the upper electrodes are connected directly by the heavy conducting body of the yoke itself. The adjacent electrodes on the yokes 56 and 57 are connected by a flexible conductor 90, so that the path of the current in this form of the device is similar to that in the form previously described, the current threading and re-threading the work to form four welds simultaneously.

Until all of the electrodes have contacted with the work, each is freely movable. Until this occurs, therefore, no pressure can be applied to the work by any of the electrodes, and all will therefore adjust themselves to the contour of the work. When all of the electrodes are in contact, however, the full welding pressure may be applied, and it will be divided equally between the electrodes by the yokes, this being an extremely important feature when the work is other than flat.

One of the principal advantages of my invention is that since a plurality of welds may be formed at one instant, these welds may be applied to the work symmetrically, so that the thermal expansion and following contraction caused thereby can be neutralized as between the two sides of the welded members, and distortion may consequently be eliminated.

The application of this principle to a specific purpose is indicated in the apparatus of Figures 5 and following, which illustrate a machine particularly adapted to the welding of stiffening ribs onto sheets for use in airfoil structures and the like. These stiffening ribs may be semi-tubular, or may have the more complex form shown in the rib 90 of Figure 5, the ribs customarily being tapered toward the outer end of the wing in order to combine minimum weight with the necessary strength. Where such a rib is welded to the sheet 91, first on one side and then on the other, a strong tendency to twist and deform the sheet develops, but this tendency is completely neutralized when the welding is accomplished in the machine shown.

This form of welder also may conveniently be mounted directly on the transformer, although other supporting bases may, of course, be used. To the support are secured massive copper electrode holders 92, of jaw-like form, to which supply leads 94 are connected. The jaws are mounted side-by-side, and hold the electrodes 95, which are merely copper blocks having elongated flat welding surfaces, the longer axes of these surfaces being transverse to the direction of the rib to be welded. Adjacent to the electrodes 95 and parallel thereto, with its center line separated from that of the electrodes 95 by a distance equal to the desired separation of the welds, is an electrode 96 supported by a jaw-electrode holder 97. This holder and its electrode is equal in length to the combined length of the two electrodes 95 plus their separation.

Mounted above the front electrodes just described, is a plunger 99 which carries the equalizing yoke 100 journaled on a pivot 101 between forked ends 102 of the plunger. Mounted on the ends of the yoke is a pair of shafts 104, which lie in the plane of the yoke and are threaded through the ends thereof for adjustment toward and away from the median plane of the yoke. The inner ends of these shafts carry, pivotally mounted thereon, secondary yoke-electrode 105, the ends of which in turn carry the contact tips 106. The planes of the secondary yokes are perpendicular to the plane of the equalizing yoke 100, and the welding tips are directly above the electrodes 95 and 96, being adjustable longitudinally of the electrodes by the movement of the shafts 104.

The yokes 105 are mounted to the shaft 104 by means of a pin 107 extending from the side of the yoke which fits in a hole drilled in the end of the shaft and is insulated therefrom by a bushing 109. An insulated screw 110 passes transversely through the wall of the recess thus formed, and is engaged by a groove 111 in the end of the pin, to prevent the displacement of the yoke from the end of the shaft, while permitting the latter to rotate without rotating the yoke.

Means are provided for automatically adjusting the position of the yoke in accordance with the position of the work. A bracket clamp 115 is secured to the end of the sheet 91 to which the reinforcing bar is to be welded, and holds one end of a cable 116, whose other end is secured by a similar clamp (not shown). The cable passes around a pulley 117 fixed to the end of the shaft 104, the size of the pulley being so chosen with respect to the pitch of the thread on the shaft 104 that as the sheet is moved through the machine the pulley turns, advancing the shaft and the yoke 105 by the proper amount to accommodate for the taper of the stiffener.

A somewhat different method of accomplishing the same result is shown in Figure 7. In this case the shaft 104' is not threaded, but is a simple plunger fitting within a suitable bore in the yoke end, and urged toward the work by a compression spring 119. A collar 120 is clamped around the shaft adjacent the yoke, and carries a guide wheel 121, this wheel engaging an angle bar 122 which is clamped to the plate 91 in contact with the edge of the stiffener. As the plate is moved the angle bar and guide wheel maintain the yoke in proper position with relation to the stiffening bar.

Figure 8 shows still another method of accomplishing the same result. In this case, as in the case just previously described, the shaft 104' is a simple plunger fitted within a cylindrical bore. Hydraulic or air pressure applied through a fitting 125, at the end of the bore, urges the plunger forward, and its position relative to the work is regulated by the contact of an insulating button 126 with the side of the stiffening bar 90. It is obvious that the features of the two types of positioning means last described may be combined in various ways without departing from the spirit of this invention, or that other methods of positioning the welding yoke may be used.

In each of the forms of the machine which have been described, four pairs of contacts have been used, but the invention is by no means limited to this number. Any even number of electrode pairs will give the advantage of connecting both terminals of the welding transformer to the electrodes on the same side of the work, which may be called the "front" electrodes, so that no leads need be connected to the "back" electrodes. On the other hand, any number of series welds, whether the number of pairs of electrodes be odd or even, will effect a reduction in the connected load and the power demands from the system, since, as has been shown, the resistance of one weld or of several welds in series is negligible as compared with the total impedance in the welding circuit. Four welds have been adopted in practice as giving simple form to the balancing yokes, and reducing the connected load materially, and because it has been found that up to this number of welds the short-circuiting effect of the work may safely be neglected, although a larger number of welds may be made without departing from the spirit of the invention, as exemplified by the appended claims.

I claim:

1. A welder comprising the combination with a source of low tension high intensity current, of a pair of insulated electrodes connected to said source and mounted to contact the same side of a unitary work sheet to be welded, a pair of connected electrodes mounted to contact the other side of the work only at surfaces in opposition to said first-mentioned electrodes, and means for applying an equalized pressure between said electrodes and the work.

2. A welder comprising the combination with a source of low tension high intensity current, of a pair of insulated electrodes connected to said source and mounted to contact the same side of a unitary work sheet to be welded, a pair of connected electrodes mounted to contact the other side of the work only at surfaces in opposition to said first-mentioned electrodes, a pivotally mounted yoke supporting said connected electrodes, and means for applying pressure to said electrodes through said yoke.

3. A spot welding machine comprising a frame adapted to receive a unitary work sheet to be welded between portions on each side thereof, a plurality of opposed pairs of electrodes mounted on said frame, means for advancing certain of said electrodes to said work, means for connecting certain adjacent electrodes apart from said sheet, and means insulating the connected electrodes from other electrodes on the same side of the work to form a series path for the welding current through said electrodes repeatedly threading the work.

4. A spot welding machine comprising a frame adapted to receive a unitary work sheet to be welded between portions on each side thereof, a plurality of opposed pairs of electrodes mounted on said frame, means on said frame for applying substantially equal pressure between opposed electrodes irrespective of the alinement thereof with respect to other opposed pairs, means for connecting certain adjacent electrodes apart from said sheet, and means insulating the connected electrodes from other electrodes on the same side of the work to form a series path for the welding current through said electrodes repeatedly threading the work.

5. A spot welding machine comprising a plurality of pairs of opposed electrodes, means for supporting the electrodes of each pair on opposite sides of a unitary work sheet to be welded, mounting means for said electrodes adjustable in conformity with the contour of said work sheet by contact therewith, and adjustably mounted tips on each of said electrodes operated by contact with said work to provide for uniform contact with said work.

6. A spot welding machine comprising a plurality of pairs of opposed electrodes, means for supporting the electrodes of each pair on opposite sides of a unitary work sheet to be welded, mounting means for said electrodes adjustable to permit the individual pairs to position themselves in conformity with the contour of said work, means for applying substantially uniform pressure to said electrodes irrespective of their position, and adjustably mounted tips on each of said electrodes operated by contact with said work to provide for uniform contact with said work.

7. A spot welding machine comprising a frame including a pair of supporting members adapted to receive a unitary work sheet to be welded therebetween, hydraulic pistons mounted in opposition on each of said supporting members, electrodes mounted on each of said pistons, connections between said electrodes apart from said sheet to form a welding current path threading the work repeatedly substantially normally of the plane of said work and passing in series through successive pairs of opposed electrodes, and a common actuating supply for said pistons whereby substantially equal pressure is applied to each of said electrodes.

8. A spot welding machine comprising a pair of insulated front electrodes, supply leads connected to said front electrodes, a pair of connected back electrodes, means for applying substantially equal pressure to said back electrodes to force them toward said front electrodes, and means for moving said back electrodes parallel to said front electrodes to vary their position with respect thereto.

9. A spot welding machine comprising a pair of electrodes having relatively large welding surfaces positioned substantially in the same plane, a pair of cooperating electrodes having relatively small surface area mounted in opposition to said first-mentioned electrodes, means for adjusting said smaller electrodes laterally of said larger electrodes, and means for applying substantially equal pressure between the opposed electrodes.

10. A spot welding machine comprising a pair of electrodes having relatively large welding surfaces positioned substantially in the same plane, a pair of cooperating electrodes having relatively small surface area mounted in opposition to said first-mentioned electrodes, an equalizing yoke whereon said smaller electrodes are mounted, and means on said yoke for positioning said smaller electrodes relatively to said larger electrodes.

11. A spot welding machine comprising a pair of electrodes having relatively large welding surfaces positioned substantially in the same plane, a pair of cooperating electrodes having relatively small surface area mounted in opposition to said first-mentioned electrodes, an equalizing yoke whereon said smaller electrodes are mounted, and means on said yoke responsive to the position of the work to be welded for positioning said smaller electrodes relatively to said work and said larger electrodes.

12. A spot welding machine comprising a pair of laterally extended front electrodes, an equalizing yoke mounted facing said electrodes, a pair of longitudinally adjustable support rods mounted on said yoke and in the plane thereof, an electrode mounted on each of said support rods and connected to form a portion of a series path between said front electrodes, and means responsive to the position of the work to be welded for adjusting the position of said support rods relative to said work and said front electrodes.

BRUCE BURNS.